Patented Sept. 27, 1932

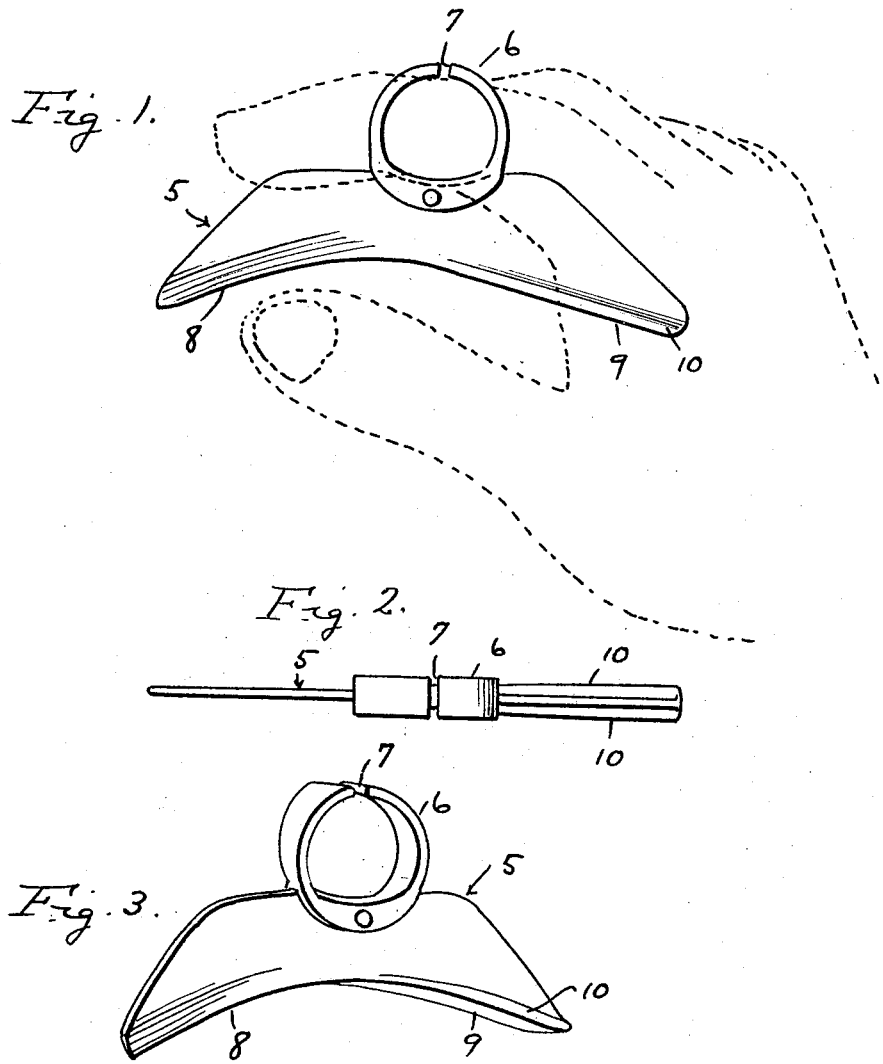

1,879,851

UNITED STATES PATENT OFFICE

VANE KRAVITZ, OF OJAI, CALIFORNIA

FRUIT CUTTING IMPLEMENT

Application filed September 8, 1931. Serial No. 561,760.

This invention relates generally to fruit cutting implements, and particularly to a new and novel fruit pitting and cutting knife constructed to be supported upon the hand of a fruit pitter, in such manner as not to be required to be held, and which possesses the additional features of novelty and advantage which will be better understood as the description thereof proceeds below.

It is an object of this invention to provide a new and novel device of the character described which enables much more quick pitting and spreading of fruit such as apricots and the like, than is possible with an ordinary pitting knife, which must be held in the hand and is likely to be dropped, with consequent loss of time and great inconvenience.

It is also an object of this invention to provide a simple and inexpensive device of the character described which is expressly formed to avoid inadvertent cutting of the hand, and which is to be comfortably worn upon a finger of the hand in position to be applied to the work.

These and other objects of the invention, its nature, and its composition and arrangement and combination of parts will be readily understood by any one acquainted with the art to which this invention relates upon consulting the following descriptions of the drawing, in which:—

Figure 1 is a general side elevational view of the device of the invention showing in dotted lines the manner of mounting it within the palm of the hand.

Figure 2 is a top plan view thereof.

Figure 3 is a perspective view.

Referring in detail to the drawing, the numeral 5 generally designates the blade portion of the device which has the general plan of a pair of conjoined wings of a bird in flight, the forward edges of the wings being presented upwardly to form the top edge of the knife, upon which is attached a ring 6 which is broken at 7 to enable its adjustment to different sizes to accommodate different sizes of index or other fingers on which it is to be worn. One end portion of the lower edge of the knife 5 indicated at 8 is sharpened for acting upon the fruit, and the remaining lower edge portion is flattened as at 9 and laterally expanded as at 10, either by overlapping the metal of the blade, or by flattening the same, or by any suitable similar construction whereby to provide that the portion 9 shall engage the fleshy portion of the hand while the knife is being operated, without cutting or otherwise injuring the hand of the operator thereof. The upper edge is reduced at each end as shown to provide at one end a convenient pointed blade formation and at the other end a formation comfortable to the palm of the hand. It is obvious that the knife of the invention though principally designed for pitting apricots, may be employed equally effectively in operating upon other fruits, such as peaches, plums, and the like, and it also may be used for picking grapes and similar fruits, and that it also provides efficient means to enable spreading the cut portions of the fruit upon the trays which are usually employed in pitting and cutting operations. It is claimed that the pitting and cutting and spreading operations may be performed by means of the device of the invention in a much more satisfactory, expeditious and safe as well as time saving manner, due to the method of supporting the knife upon the hand of the operator, and the formation of the knife itself.

It is believed that the above is sufficient description to enable any one acquainted with the art to which this invention relates to understand, make and use the same, and further description is, therefore, believed unnecessary.

It is to be definitely understood that I do not desire to limit the application of this invention to the particular modification set out herein to illustrate principles thereof, and any change or changes may be made in material and structure and arrangement of parts consistent with the spirit and scope of the invention.

What is claimed is:—

1. A fruit cutting implement adapted to be held within the palm of the hand when operating upon fruit, comprising, an elongated flat plate, a sharpened portion extending from an intermediate point of the lower longitudinal edge of the plate to one end thereof, a dull enlarged portion extending from said intermediate point to the other end of the plate for preventing cutting of the fleshy part of the palm of the hand when using the implement, and a finger receiving ring secured upon and extending from an intermediate point of the remaining upper longitudinal edge of the plate for conveniently mounting the device in the palm of the hand and assisting in its manipulation, said plate having each end angularly reduced from its upper longitudinal edge outwardly toward the terminii of its lower longitudinal edge, thereby providing at one end a formation to accommodate and be engaged by a portion of the palm of the hand, and at the other end a pointed blade for working upon the fruit, said pointed blade being extended only slightly beyond the tips of the fingers when the implement is in position in the hand.

2. A fruit cutting implement adapted to be held within the palm of the hand while manipulating the same, comprising, an elongated flat plate, a finger receiving ring secured intermediate the ends of the upper longitudinal edge of the plate and extending therefrom for mounting the implement within the palm of the hand and assisting in the manipulation thereof, a sharpened portion on the lower longitudinal edge of the plate extending from approximately the middle thereof to the outer end of the plate, and a dull and laterally enlarged portion extending from the inward termination of said sharpened portion to the inward end of the plate for protecting and conforting the portions of the palm of the hand which may come into contact with the inward portion of the lower edge of the implement during the carrying and manipulation thereof.

In testimony whereof I affix my signature.

VANE KRAVITZ.